(No Model.) 2 Sheets—Sheet 1.
S. P. WALMSLEY.
TURNSTILE.
No. 517,080. Patented Mar. 27, 1894.
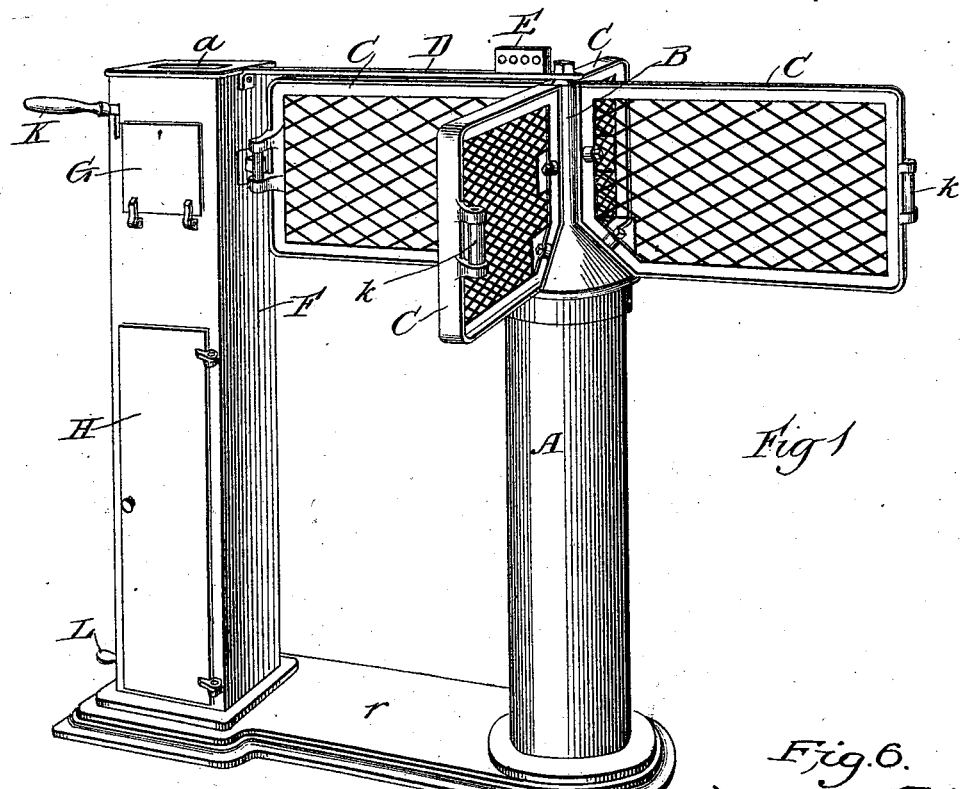

(No Model.) 2 Sheets—Sheet 2.
S. P. WALMSLEY.
TURNSTILE.
No. 517,080. Patented Mar. 27, 1894.
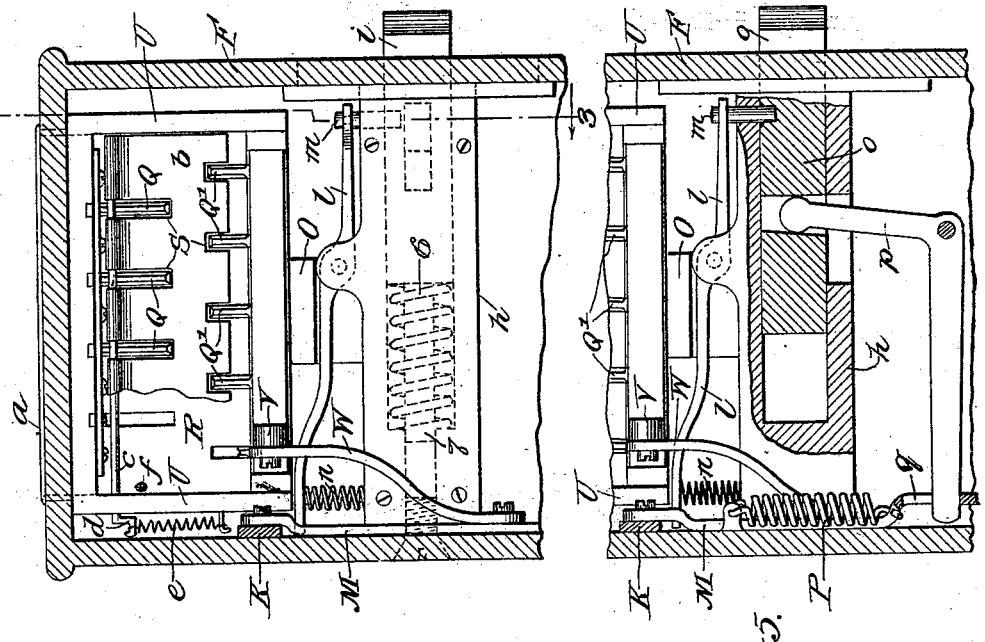
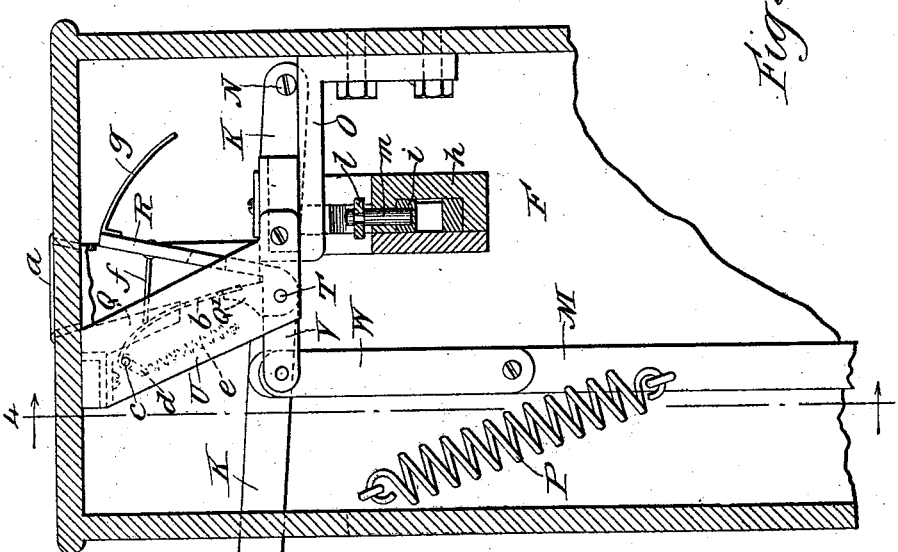
Witnesses
Inventor
S. P. Walmsley
by Raymond & [illegible]
Attys.

UNITED STATES PATENT OFFICE.

SYLVESTER P. WALMSLEY, OF NEW ORLEANS, LOUISIANA.

TURNSTILE.

SPECIFICATION forming part of Letters Patent No. 517,080, dated March 27, 1894.

Application filed March 24, 1893. Serial No. 467,420. (No model.)

*To all whom it may concern:*

Be it known that I, SYLVESTER P. WALMSLEY, a citizen of the United States, residing in New Orleans, in the parish of Orleans and State of Louisiana, have invented certain new and useful Improvements in Turnstiles, of which the following is a specification, reference being had to the accompanying drawings.

This invention relates to improvements in turn-stiles and has for its object to combine therewith devices whereby the turn-stile cannot be passed without the deposit and mutilation of a ticket of admission, and further, without the registration of each partial revolution of the turn-stile necessary to give admittance or passage to the individual depositing the ticket.

Another object is to insure the mutilation of the ticket deposited before the turn-stile can be operated.

A further object is to avoid the possibility of a ticket passing through the chopper or mutilator without being mutilated, and also to prevent a ticket being improperly deposited in the machine during the operation thereof.

These and other objects hereinafter set forth are accomplished by the devices illustrated in the accompanying drawings, in which—

Figure 1 represents a perspective view of a turn-stile embodying my invention, taken from the rear side thereof. Fig. 2 is a plan view thereof. Fig. 3 is a transverse vertical section on the line 3—3 of Fig. 4 looking in the direction indicated by the arrows. Fig. 4 is a longitudinal vertical section on the line 4—4 of Fig. 3 looking in the direction indicated by the arrows; and Fig. 5 is a detail section similar to Fig. 4 but showing a modification of my invention. Fig. 6 is a central transverse vertical section of the upper end portion of the gate-post and of the lower end portion of the gate-hub, showing the attachments for preventing reversed movement of the gate proper.

Similar letters and numerals of reference indicate the same parts in the several figures of the drawings.

I may here state that so far as relates to the broad idea of my invention, the construction and manner of operation of either the turn-stile, register or ticket mutilator are immaterial, for any groups of mechanism accomplishing the desired result are especially contemplated by this invention, although the ticket mutilator or chopper and the locking mechanism for the turn-stile connected therewith and operated thereby, possesses many advantages over any other device of the same kind known to me and for that reason only is preferred.

The turn-stile proper comprises the post A constituting the bearings for an upright, rotatable shaft B having secured thereto at the upper end thereof, which projects outside of the post, the wings C of any suitable character, constituting the gates.

To the frame or brace D, or in any other suitable manner or place, is secured a register E of any suitable construction, co-operating with the turn-stile in such a manner that each partial rotation of the turn-stile that permits the entrance of a person will be recorded by the register.

It is to be understood that the register E shown in the drawings, is simply so placed for the purpose of illustration for my invention broadly contemplates any register of any character and located in any relation to the turn-stile that will subserve the intended purpose, for which reason it is not deemed necessary to herein illustrate or describe in detail the construction or operation of any register, many forms of which are now well known.

At a suitable distance from the post A, so as to permit the wings C to pass between it, and the post, is located an upright box or casing F containing preferably in the upper end thereof, a ticket chopper or mutilator with which is connected a bolt locking the turn-stile against rotation except when the mutilator is actuated, access being gained to such internal mechanism through a door G or in any other suitable manner, while in the lower end of the post may be located a receiving box of any suitable character in which the mutilated tickets are deposited when discharged from the mutilating apparatus, the box being inserted in and withdrawn from the casing through a door H or in any other convenient manner. A reverse rotation of the turn-stile may be prevented by any of the many forms of pawl and ratchet connections between the rotating turn-stile and the stationary post supporting the same, or the teeth I operating the register E may, if desired, subserve this purpose, although the former is preferred by reason of its greater strength and its presence in the common forms of turn-stile.

For the purpose of illustration, I have shown, in Fig. 6, a pawl and ratchet mechanism for preventing such reversed rotation of the gate. A circular ratchet 2 is formed or suitably secured upon the upper end of the gate post or standard A, and the teeth of this ratchet are engaged by the lower end of a pawl 3 which is pivoted at its upper end to the lower end of the hub B of the gate proper; the arrangement being such that as the gate is turned in the proper direction, the pawl 3 will ride over the ratchet-teeth 2 so as not to interfere with such proper rotation of the gate. If, however, it be attempted to rotate the gate in the reversed direction, the pawl 3 will instantly engage with one of the ratchet-teeth 2 and prevent such improper rotation of the gate.

As before stated, the particular construction of any of these groups of mechanism is immaterial to the broad idea of my invention but in Figs. 3, 4 and 5 I have shown in detail a ticket chopper mechanism with which is connected a lock for the turn-stile operated by and simultaneously with, the mutilating apparatus, which I believe to be of novel construction and operation.

This apparatus may be operated either by the hand lever K or the foot lever or pedal L (shown only in Figs. 1 and 2), which levers are pivotally connected by a rod M within the casing. The hand lever K is pivoted at its inner end N to a bracket O or to any suitable part of the stationary casing and is vibrated vertically, being preferably returned to its normal elevated position by means of a coil spring P attached at its ends respectively to the casing F and to the rod M, although obviously any other spring or equivalent device for elevating the hand lever may be employed without departing from the spirit of my invention.

The cutting jaws of the mutilator consist generally of a fixed and a movable jaw, the fixed jaw consisting of a series of cutters Q, Q' rigidly secured in an alternate or staggered relation, as more clearly illustrated in Fig. 4, while the movable jaw consists of an oblong plate R provided with a series of complementary notches S in the upper and lower edges thereof corresponding in number and location with the cutters Q and Q', so that when the jaw R is moved, the stationary cutters will enter the notches therein and the meeting edges will operate to cut or mutilate a ticket there between in much the same manner as a pair of shears, the purpose being, to cut out of the ticket pieces corresponding in number and location with the notches S in the movable cutter jaw.

The movable cutter jaw R is pivoted at T to the frame U and is provided near one end with a lateral lug V to which is pivotally connected one end of a link W, the opposite end of which is pivotally secured to the connecting rod M, so that when the said rod is operated either by the hand lever K or the pedal L, the jaw R will be given a corresponding movement upon its pivot.

As will be seen from Figs. 3 and 4, there is an opening or seperation between the ends of the stationary cutters Q, Q' through which the body of a mutilated ticket is designed to pass, the tickets being delivered between the fixed and movable cutting jaws by a suitably arranged chute $a$ in which the tickets are deposited. To prevent the tickets falling through the opening between the ends of the stationary cutters Q, Q' without being first mutilated, I provide a yielding flap or shield $b$ preferably of sheet metal, suitably slotted to pass over the stationary cutters and pivoted at $c$ to the frame U, the end of the pivot being bent beyond the frame U so as to form a crank $d$ to which is secured one end of a coiled spring $e$, the opposite end of which is attached to the said frame. The tendency of this spring $e$ is to normally and yieldingly hold the flap or shield in the position shown in Fig. 3, closing the opening between the cutters Q and Q', but upon the first movement of the movable jaw R a pin or projection $f$ thereon strikes the flap or shield $b$ and forces the same back out of the way so that the ticket when mutilated by the jaws, will drop through and fall into the receptacle provided for that purpose. Upon the reverse movement of the movable cutting jaw the flap will return to its normal position and reclose the opening between the fixed cutters of the stationary jaw, ready to receive the next ticket.

To prevent a ticket being misplaced in the machine if deposited while the stationary and movable jaws are together, which would result in dropping the ticket in behind the jaw R without its being mutilated, the said jaw is provided with a curved shield $g$ projecting rearwardly therefrom, which moves over so as to close the chute $a$, while the jaw R is over on the opposite side of the chute in the act of mutilating a ticket. Immediately below this mechanism is located a suitable casing $h$ in which works a spring-actuated lock bolt $i$ normally projected out of the casing F into the path of movement of the end-bar of the wings C of the turn-stile, or preferably into the path of movement of an anti-friction roller $k$ carried by said bars. This lock bolt serves to prevent a rotation of the turn stile as long as it remains projected and it can only be withdrawn so as to permit a partial rotation of the turn-stile by the operation of the chopping mechanism.

As shown in Fig. 4, a spiral spring 6 is employed for throwing the bolt $i$ outward, this spring surrounding an inward extension 7 of the inner end of the bolt, and lying within the casing $h$. The spring 6 is interposed between the inner wall of the casing $h$ and a shoulder formed by the inner end of the bolt $i$ and exerts its pressure against said bolt to throw the latter outward. This is accomplished through the medium of a lever $l$ pivoted to the casing $h$ and carrying at its forward free end a locking pin $m$ working through the casing $h$ and engaging a socket $m'$ in the lock-bolt $i$ when the parts are in their normal position shown in the drawings. The opposite end of the lever $l$ projects into the path of movement of the hand-lever K and is held in its normal position by the action of a coiled spring $n$, or any equivalent device, which will be compressed when the hand-lever is depressed so as to engage the inner end of the lever $l$, thereby causing a corresponding elevation of the outer end of the lever $l$ and the withdrawal of the locking pin $m$ from engagement with the lock bolt of the turn-stile. This permits the lock-bolt to be forced into the casing $h$ against the tension of its protracting spring 6 under the pressure of the rollers on the turn-stile, thereby permitting a partial rotation of the turn-stile. Immediately, however, the hand-lever is restored to its normal elevated position, the lock pin $m$ will be returned to its socket $m'$ in the lock-bolt $i$ of the turn-stile and the latter will be locked against any further rotation until another depression of the hand-lever in the act of mutilating another ticket of admission.

Between the hand-lever K and the lock-pin operating lever $l$ sufficient lost motion is provided to require nearly a full stroke of the hand-lever before the lock-pin will be withdrawn from engagement with the lock-bolt, and hence sufficient to insure the mutilation of the ticket before the turn-stile can be operated to permit the entrance of the person depositing the ticket in the mutilator.

In Fig. 5 I have shown a slight modification of my invention in which in lieu of the spring-actuated bolt $i$ is substituted a bolt $o$ positively operated in both directions by a bell-crank lever $p$ engaged and actuated by the rod M. The end of the bell crank lever works in the elongated slot $q$ in the rod M so as to allow sufficient lost motion of the said rod to permit the withdrawal of the lock-pin $m$ from engagement with the lock-bolt $o$ before the latter will be actuated by the bell crank lever. In other respects the operation of the device is identical with that previously described. Of course if the foot-lever or pedal L were dispensed with the rod M could be shortened considerably and need not be any longer than is necessary for the attachment of the link W, and in fact both the rod M and link W might be dispensed with and the lug V be directly and pivotally connected with the lever K by a slot and pin connection, but the construction shown and described is preferred because of the greater certainty of its operation and the absence of binding, which might produce an undue friction in the operation of the ticket mutilator.

A turn-stile constructed in accordance with my invention embodies numerous advantages over any previously constructed, chief among which is the certainty with which fraud may be prevented in the admittance of persons without depositing the required ticket of admission, a fraud which might easily be perpetrated by the gate-man or operator if the ticket mutilator alone were employed or if the ticket mutilator and turn-stile alone were employed without the register. With my device, however, the register on the turn-stile operates as an effectual check upon the gate-man, for should he hold the operating lever depressed so as to permit the continuous turning of the turn-stile, the register thereon would tally or record each admission and the difference between the recorded admissions and the mutilated tickets would be readily detected. Besides this, the turn-stile cannot be operated to give admission without mutilating the ticket deposited therein, which is an effectual check upon fraud in that direction, while the lock of the turn-stile which is dependent for its operation upon the main operating lever of the mutilator, will prevent the crowding in or accidental admission of any person who has not previously deposited the ticket of admission in the mutilator. It will of course be understood that the passage way will be parallel with the base $r$ supporting the post A and casing F, the operator standing on the near side of the turn-stile as illustrated in Fig. 1, and the passengers passing in on the farther side thereof.

Having thus described my invention, what I claim as new therein, and desire to secure by Letters Patent, is—

1. The combination with a turn-stile and a ticket mutilator of a lock for the turn-stile connected with and actuated by or through the mutilator mechanism, substantially as described.

2. The combination with a turn-stile and a ticket mutilator of a lock for the turn stile connected with and actuated by or through the mutilator mechanism, and a register connected with the turn-stile for recording the partial rotations thereof, substantially as described.

3. The combination with a turn-stile and a register therefor of a ticket mutilator mechanism, and a lock for the turn-stile connected with and operated by or through said mechanism, after the latter has mutilated the ticket, substantially as and for the purpose described.

4. The combination with a turn-stile and a register therefor of a lock for the turn-stile and a ticket mutilator mechanism comprising a stationary and a movable jaw, a lever for operating the same, and a lock pin for securing the lock-bolt of the turn-stile against movement actuated by or through the movement of said lever, substantially as described.

5. The combination with a turn-stile and a register therefor of a lock for said turn-stile and a ticket mutilating mechanism comprising a stationary and a movable jaw, a lever for operating the movable jaw, a lock-pin for securing the lock-bolt of the turn-stile against movement, and a lever for operating said pin, actuated in one direction by the first mentioned lever and in the opposite direction by a spring or equivalent device, substantially as described.

SYLVESTER P. WALMSLEY.

Witnesses:
    W. R. OMOHUNDRO,
    TODD MASON.